United States Patent
Batra et al.

(10) Patent No.: US 7,640,331 B2
(45) Date of Patent: Dec. 29, 2009

(54) DEVELOPING QOS AWARE PERVASIVE APPLICATIONS FOR WEB SERVICE INTERACTION

(75) Inventors: Vishal Singh Batra, Noida (IN); Nipun Batra, Noida (IN)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 11/321,179

(22) Filed: Dec. 29, 2005

(65) Prior Publication Data

US 2007/0156867 A1 Jul. 5, 2007

(51) Int. Cl.
G06F 15/173 (2006.01)
(52) U.S. Cl. ............. 709/223; 709/202; 709/224; 709/226; 709/229; 709/245; 370/252; 370/254
(58) Field of Classification Search ............ 709/202, 709/223, 224, 226, 229, 245; 379/252, 254
See application file for complete search history.

(56) References Cited

U.S. PATENT DOCUMENTS

| | | | |
|---|---|---|---|
| 7,386,620 B2* | 6/2008 | Lei et al. ............... | 709/229 |
| 2004/0030777 A1* | 2/2004 | Reedy et al. ............ | 709/224 |
| 2004/0064548 A1 | 4/2004 | Adams et al. | |
| 2004/0103195 A1 | 5/2004 | Chalasani et al. | |
| 2004/0205613 A1 | 10/2004 | Li et al. | |
| 2004/0220910 A1 | 11/2004 | Zang et al. | |
| 2005/0050184 A1 | 3/2005 | Boden et al. | |
| 2005/0060163 A1 | 3/2005 | Barsness et al. | |

OTHER PUBLICATIONS

Quality Driven Web Services Composition, L Zeng, B Benatallah, M Dumas, J Kalagnanam, Quan Z. Sheng, International World Wide Web Conference Proceedings of the 12th international conference on World Wide Web, Budapest, Hungary, May 20-24, 2003.*
Symantically Driven Service Interoperability for Pervasive Computing, Declan O'Sullivan, David Lewis, Proceedings of the 3rd ACM international workshop Sep. 19, 2003.*
Vishal S. Batra, Nipun Batra; "*Improving Web Service QoS for Wireless Pervasive Devices*"; Jul. 2005; Orlando FL; ICWS Conference.

(Continued)

*Primary Examiner*—Nathan J Flynn
*Assistant Examiner*—Mohammad A Siddiqi
(74) *Attorney, Agent, or Firm*—Jeffrey T. Holman (57) ABSTRACT

A system is described for selecting web services accessible over a network (380). The system comprises a pervasive device (10), one or more servers (20) in communication with the network (380) and supporting at least one base web service (502) that provides an output in reply to a request from the pervasive device (10). The system further comprises one or more servers (20) supporting at least one extended web service (606) operable to reduce a computational load of the pervasive device (10) in an interaction with the base web service (502). An application (504) running on the pervasive device (10) evaluates attributes of a Quality of Service (QoS) model relating to interactions between pervasive device (10), a base web service (502) and corresponding expanded web service (606). The application (504) chooses whether or not to use the corresponding web service based on the evaluated attributes.

15 Claims, 5 Drawing Sheets

OTHER PUBLICATIONS

T. Kwok et al.; "*An efficient and systematic method to generate xslt stylesheets for different wireless pervasive devices*"; 2004; pp. 218-219; WWW; ACM Press; New York, USA.

IBM WebSphere Transcoding Publisher Version 1.1: "*Extending Web Applications to the Pervasive World*", 2000; IBM Redbook.

A. Pashtan, S. Kollipara, M. Pearce; "*Adapting Content for Wireless Web Services*"; 2003; pp. 79-85; IEEE Internet Computing.

Mikko Laukkanen, Heikki Helin, "*Web Services in Wireless Networks—What Happened to the Performance?*", ICWS, CSREA Press, Las Vegas, USA, 2003.

Yairv Aridor et al, "*Knowledge encapsulation for focused search from pervasive devices*", ACM Transactions on Information Systems, ACM Press, New York, USA, 2002, pp. 25-42.

\* cited by examiner

DEVELOPING QOS AWARE PERVASIVE APPLICATIONS FOR WEB SERVICE INTERACTION

FIELD OF THE INVENTION

The present invention relates to enabling interaction between software applications running on disparate platforms and, in particular, to determining interaction based on a Quality of Service (QoS) model.

BACKGROUND

In recent years there has been a significant rise in the provision of web services. Such services should be accessible by a wide variety of client applications hosted on platforms that may range from high-end servers to pervasive devices such as mobile telephones and personal digital assistants (PDAs). Platform-independent and language-independent collaboration among distributed and cross-vendor applications is advantageous. To enable this platform and language independence, web services typically use the Hyper Text Transfer Protocol (HTTP) and the eXtensible Markup Language (XML) data model to exchange messages.

Besides language independence, the XML data model also offers a document-based interaction, enabling aggregate and complex data structures to be exchanged between the service and client applications in a single interaction. While the service providers may offer generic service response to cater to the requirements of diverse client applications, it is the responsibility of the client application to extract relevant data from the service response.

As an illustrative example, a web service is considered that provides addresses of ATM locations near a given zip and country code. For a requested zip code of '134', the web service may provide a response such as that shown in Appendix A, including information about the location of ATMs that accept AMX, VISAA, MASTCARD and DNERCARD cards (corresponding to American Express™, Visa™, Mastercard™ and Diners Club™ cards). However, the client application making the request may only be interested in ATM locations accepting AMX cards, and may thus require only a limited subset of the response. Appendix B shows the subset of the web service response that is of interest to the client application, i.e. only the information relating to AMX cards.

Applications deployed on network-enabled pervasive devices (for example a mobile phone) can access and exchange data with the web services to offer desired information to the end user on demand. However, such pervasive devices typically have limitations on their available power and network bandwidth. The pervasive devices may consequently suffer from excess airtime requirements and power consumption as a result of networking and parsing any excess data provided by web services.

While several techniques have been developed that allow server applications to be sensitive to the client device capacity while providing a response, these techniques have been focused on transforming display elements to make the response compatible with the display capability of the client device. Typically, the display characteristics of the client device are configured and embedded in the server application framework.

There is an ongoing need for methods that efficiently exploit the resources of client devices in interactions with web services.

SUMMARY

The present disclosure describes extensions to web services that enable a client device to offload some computational tasks to the web service. As there may be an extra fee for offloading such tasks, a Quality of Service (QoS) model is introduced, enabling the client device to perform a benefit analysis and determine when the extended web services may be used to optimize overall cost and resource usage.

According to a first aspect of the invention there is provided a method of selecting web services accessible over a communications network from a pervasive device, said web services including at least one base web service and corresponding extended web service, said method comprising the steps of:

evaluating attributes of a Quality of Service (QoS) model, said attributes relating to the use of the base web service and extended web service by said pervasive device;

assessing said attributes according to predetermined selection criteria; and selecting one of the base web service and extended web service based on said assessed attributes.

According to a further aspect of the invention there is provided an apparatus for selecting web services accessible over a communications network from a pervasive device, said web services including at least one base web service and corresponding extended web service, said apparatus comprising:

means for evaluating attributes of a Quality of Service (QoS) model, said attributes relating to the use of the base web service and extended web service by said pervasive device;

means for assessing said attributes according to predetermined selection criteria; and means for selecting one of the base web service and extended web service based on said assessed attributes.

According to a further aspect of the invention there is provided a system for selecting web services accessible over network, said system comprising:

a pervasive device in communication with said network;

one or more servers in communication with said network and supporting at least one base web service that provides an output in reply to a request from said pervasive device; and one or more servers in communication with said network and supporting at least one extended web service operable to reduce a computational load of said pervasive device in an interaction with said base web service, wherein an application running on said pervasive device evaluates attributes of a Quality of Service (QoS) model relating to interactions between said pervasive device, a said base web service and corresponding expanded web service, and wherein said application chooses whether or not to use said corresponding web service based on said evaluated attributes.

According to a further aspect of the invention there is provided a computer program product comprising machine-readable program code recorded on a machine-readable recording medium, for controlling the operation of a data processing apparatus on which the program code executes to perform a method of selecting web services accessible over a communications network from a pervasive device, said web services including at least one base web service and corresponding extended web service, said computer program product comprising:

code for evaluating attributes of a Quality of Service (QoS) model, said attributes relating to the use of the base web service and extended web service by said pervasive device;

code for assessing said attributes according to predetermined selection criteria; and code for selecting one of the base web service and extended web service based on said assessed attributes.

BRIEF DESCRIPTION OF DRAWINGS

One or more embodiments of the invention will now be described with reference to the drawings, in which.

The embodiments are also described with reference to the Appendices, in which:

Appendix A is an example of a response received from a web service listing ATM locations;

Appendix B is an example of a subset of the response of Appendix A that is of interest to the application requesting information from the web service; and Appendix C is an example of an eXtensible Stylesheet Language (XSL) that may be used to filter and process the web service response in the extended web service.

DETAILED DESCRIPTION

In the arrangements described below, an extended web service allows applications running on pervasive devices to offload some computational tasks to the web service. Such offloading may reduce the size of the response received from the web service, thus reducing the airtime and power consumption of the pervasive device. As there may be an extra fee involved in offloading tasks from the client application to the web service, a Quality of Service (QoS) model is described that enables the application running on the pervasive device to perform a benefit analysis. The analysis allows the device to dynamically decide appropriate runtime conditions where spending the extra fee to use the extended web service will optimize resource usage. The QoS model is sensitive to each specific service, response times, client application and the available resources of the pervasive device. This allows each application hosted on the pervasive device to have an associated benefit analysis policy to choose between the base and extended web service.

Operating Environment

Figure 1:
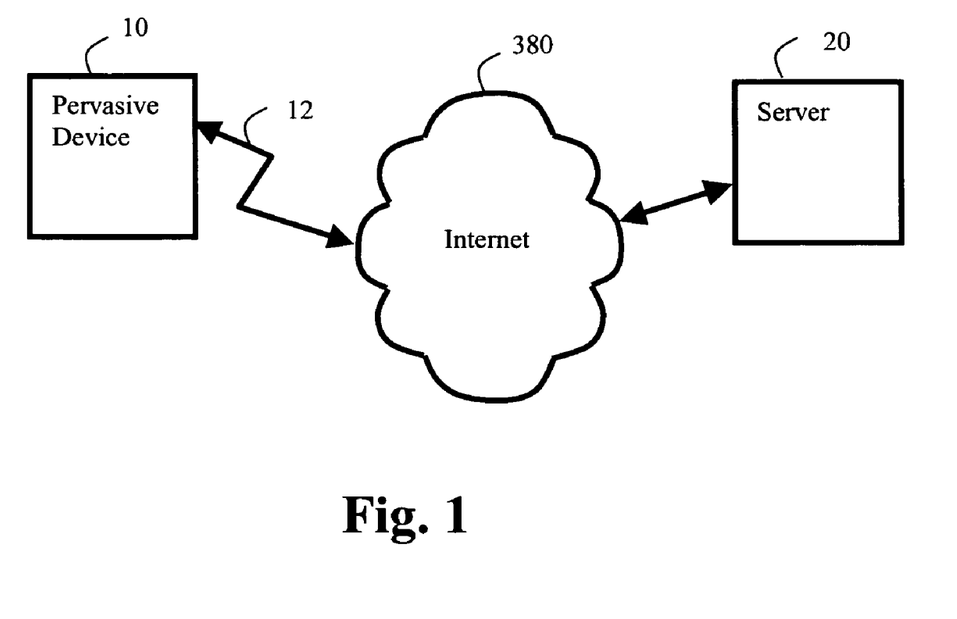
FIG. 1 is a schematic diagram of an operating environment in which a pervasive device communicates over a network with a web server.

The growth of information available on the Internet has created a demand to enable pervasive handheld devices to access the Internet and browser-based web applications. The operating environment is illustrated in FIG. 1, which shows the Internet 380 and a server 20 in communication with the Internet 380. The server 20 hosts software and databases that operate to provide a web service. An example of such a web service used for illustrative purposes in this description provides a listing of ATMs near a specified location.

A hand-held pervasive device 10, is network-enabled, permitting the pervasive device 10 to communicate via the Internet 380. The link 12 to the Internet 380 may be wireless. The pervasive device 10 may thus request services from the web service operating on the server 20. The structure of the server 20 and pervasive device 10 is discussed in more detail with reference to FIG. 2.

Examples of pervasive devices are two-way pagers, personal digital assistants (PDAs), cellular phones, smart appliances for the home and smart devices permanently mounted in vehicles. Typically, pervasive devices have limited processor speed, memory capacity and communication bandwidth compared to less transportable computing devices such as a desk-top computer. There is frequently a need to maximize the relatively short battery life of portable pervasive devices, which limits the addition of memory capacity or processor power to the pervasive device.

Pervasive devices 10 typically have limited processing power and memory compared with computing devices that are not designed to be carried around. In general, the pervasive devices have built-in power supplies such as a battery. Accordingly, power consumption is a consideration in designing applications for the pervasive devices 10, as it is undesirable for the available power to be exhausted too quickly. The power consumption of the pervasive device 10 varies between standby operation and airtime. Airtime is the time during which the device 10 is used for conversation and data exchange. Standby time is the time in which the pervasive device 10 is ready to receive or transmit data, but is not actually being used in a call.

Although the operating environment is described with reference to a pervasive device 10, the described methods and QoS model may be adapted for more general application to client devices such as desk-top computers. For ease of illustration, a single server 20 and pervasive device 10 are shown in FIG. 1. In practice a plurality of servers and client devices communicate via the Internet 380.

The application hosted on the pervasive device 10 connects to a web service over the HTTP and/or HTTPS protocol as provided by the pervasive device operating system and software and the network service provider. Once the device 10 is connected to the server 20 hosting the web service, the application can invoke the web service by referring to the name of the service and passing the required input parameters to the web service. Typically, web services provide an XML data format to specify request and response. The application passes the request parameters encoded in XML as per the syntax specified by the web service. On receiving the parameters, the web service executes the request and prepares the response in pre-defined XML syntax. The response is communicated back to the application. The web service can be implemented to execute the request synchronously or asynchronously. If the web service is synchronous, the application 'waits' till the time web service executes the request and prepares the response. On receiving the response, the application parses the XML data and extracts the required information either for further processing or for presentation to the end user.

Figure 2:
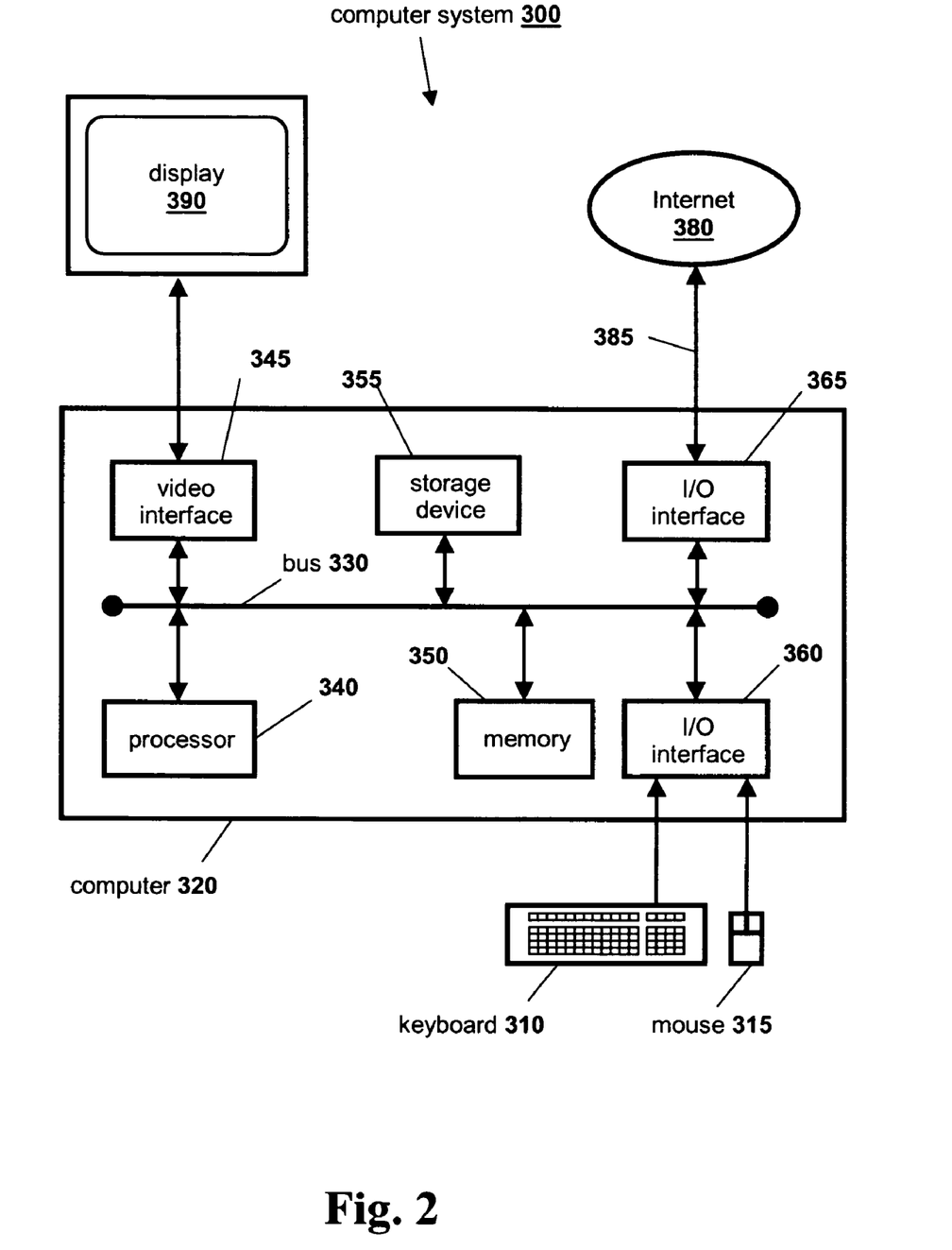
FIG. 2 is a schematic diagram of a general-purpose computer system that may be used in the environment of FIG. 1.

FIG. 2 is a schematic representation of a computer system 300 of a type that is suitable for executing software for the provision of a web service. Computer software executes under a suitable operating system installed on the computer system 300, and may be thought of as comprising various software code means for achieving particular steps. The computer system 300 may be used as the server 20. With the modifications described below, the structure of the computer system 300 may also be used in the pervasive device 10.

The components of the computer system 300 include a computer 320, a keyboard 310 and mouse 315, and a display 390. The computer 320 includes a processor 340, a memory 350, input/output (I/O) interfaces 360, 365, a video interface 345, and a storage device 355.

The processor 340 is a central processing unit (CPU) that executes the operating system and the computer software executing under the operating system. The memory 350 may include random access memory (RAM) and read-only memory (ROM), and is used under direction of the processor 340.

The video interface 345 is connected to display 390 and provides signals for display on the display 390. User input to operate the computer 320 is provided, for example, from the keyboard 310 and mouse 315. Other types of input, such as a microphone, may also be used. Signals may also be output audibly, using one or more speakers (not shown). The storage device 355 may include a disk drive or any other suitable storage medium.

Each of the components of the computer 320 is connected to an internal bus 330 that includes data, address, and control buses, to allow components of the computer 320 to communicate with each other via the bus 330.

The computer system 300 may be connected to one or more similar computers via a input/output (I/O) interface 365 using a communication channel 385 to a network, represented in FIG. 2 as the Internet 380.

The computer software may be recorded on a portable storage medium, in which case the computer software program is accessed by the computer system 300 from the storage device 355. Alternatively, the computer software can be accessed directly from the Internet 380 by the computer 320. In either case, a user can interact with the computer system 300 using, for example, the keyboard 310 and mouse 315 to operate the programmed computer software executing on the computer 320.

Other configurations or types of computer systems can be equally well used to execute computer software that assists in implementing the techniques described herein. Furthermore, custom-made devices and specialized hardware such as digital signal processors may be used in the implementation of the described techniques.

The handheld pervasive device 10 may have a similar computational structure to that shown in FIG. 2. The display 390 and keypad are integrally formed in the pervasive device 10, which typically does not have a mouse 315. The I/O interface 365 in device 10 may be a transceiver for sending and receiving signals via a cellular network, and the device 10 further includes a microphone and speaker to process audible inputs and outputs.

Pervasive Devices and Applications

With the availability of application frameworks and runtimes for pervasive devices 10, such as Java™ Micro Edition (J2ME), a wide variety of applications ranging from games to business may be developed and deployed by pervasive devices 10. (Java is a trademark of Sun Microsystems, Inc.). The network-enabled devices 10 enable pervasive applications to access web services, thus enhancing the capability and value of such devices.

As commercial and fee-based web services emerge, more and more pervasive applications will be demanded to access these services for information or business, without compromising the resources of the devices 10. It is thus important to analyze the interaction between pervasive applications and the web services to improve the QoS for the device 10 and the end user. The QoS definition for the pervasive device 10 and end user includes not only the service response time but also the utilization of device resources and other costs such as the service fee. The information extraction from a large service response may not cause a substantial overhead for applications deployed on servers 20 having ample resources, but may create performance overheads for the applications running on pervasive devices 10 in the situations described below.

1. A large response is communicated to a pervasive device 10 having limited network bandwidth and thus consuming a lot of device airtime and power.

2. The response may have a complex and deeply nested XML schema, thus making relevant information extraction slow due to the limited memory and processor speed of the device 10.

3. The most severe overhead caused by the web service arises from the provision of a response that is too big for the pervasive device 10 to handle due to its limited memory. Such a service will initially consume airtime and service fee and will eventually cause the application to fail with a memory error. For example, consider a restaurant locator service providing a list of restaurants near a given street address. The response size of such a service sent from server 20 to device 10 may usually be within the tolerable payload limits of the device 10. However, the same service may provide a large response payload if the service finds a food court near the requested address.

Providing an Extended web Service

In view of the problems with performance overheads, a methodology is now described for managing the interaction of web services with pervasive applications. The described arrangements take into account possible cost overheads that the service provider and end user may incur with the interaction method. A benefit analysis scheme is used to compare the standard and extended interaction methods with the objective of improving the service QoS for the device 10 and the end user.

Figure 3:
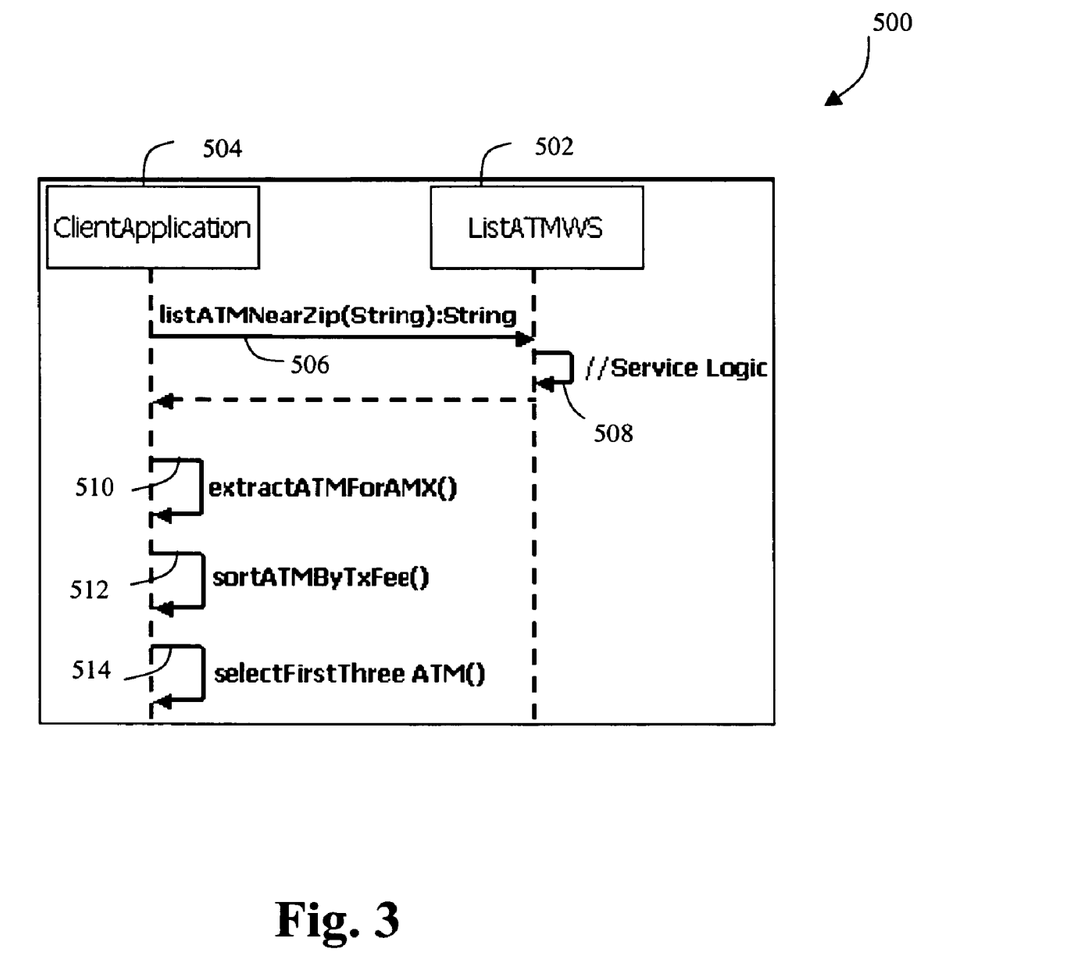
FIG. 3 shows a flow diagram of a prior-art method of a client application interacting with a web service.

FIG. 3 illustrates a base (or non-extended) method 500 of requesting a web service, using the ATM location example for illustrative purposes. The web service deployment method 500 allows the service provider to explicitly define and publish the request and response specification (schema) of the service to allow any external third party application to transparently interact with the web service. Since the response schema is published in detail, it is programmatically easy for applications to parse and extract information from the same. If the service is developed to cater to the requirements of diverse cross-vendor applications, the service response may require data filtering to extract relevant information at the client end 10. This may create performance overheads for pervasive applications.

The web service running on server 20 is 'ListATMWS' 502. In initial step 506, a client application 506 running on the pervasive device 10 sends a request to the web service for a list of ATMs near a specified location. The request has the format 'listTMNearZip(String):String'. Next, in step 508, software on the server 20 executes to provide a response which may, for example, have the form shown in Appendix A. The response is received by the pervasive device 10, which must then perform further processing 510, 512, 514 to extract the desired subset of information relating to AMX cards. Step 510, 'extractATMForAMX( )', extracts information relating to ATMs that accept AMX cards. Step 512, 'sortATMByTx-Fee', then sorts the ATM locations according to the respective transaction fees. Finally, step 514, 'selectFirstThreeATM( )', selects the three ATMs from the head of the list for display on the pervasive device 10. The resultant output may be that shown in Appendix B.

Figure 4:
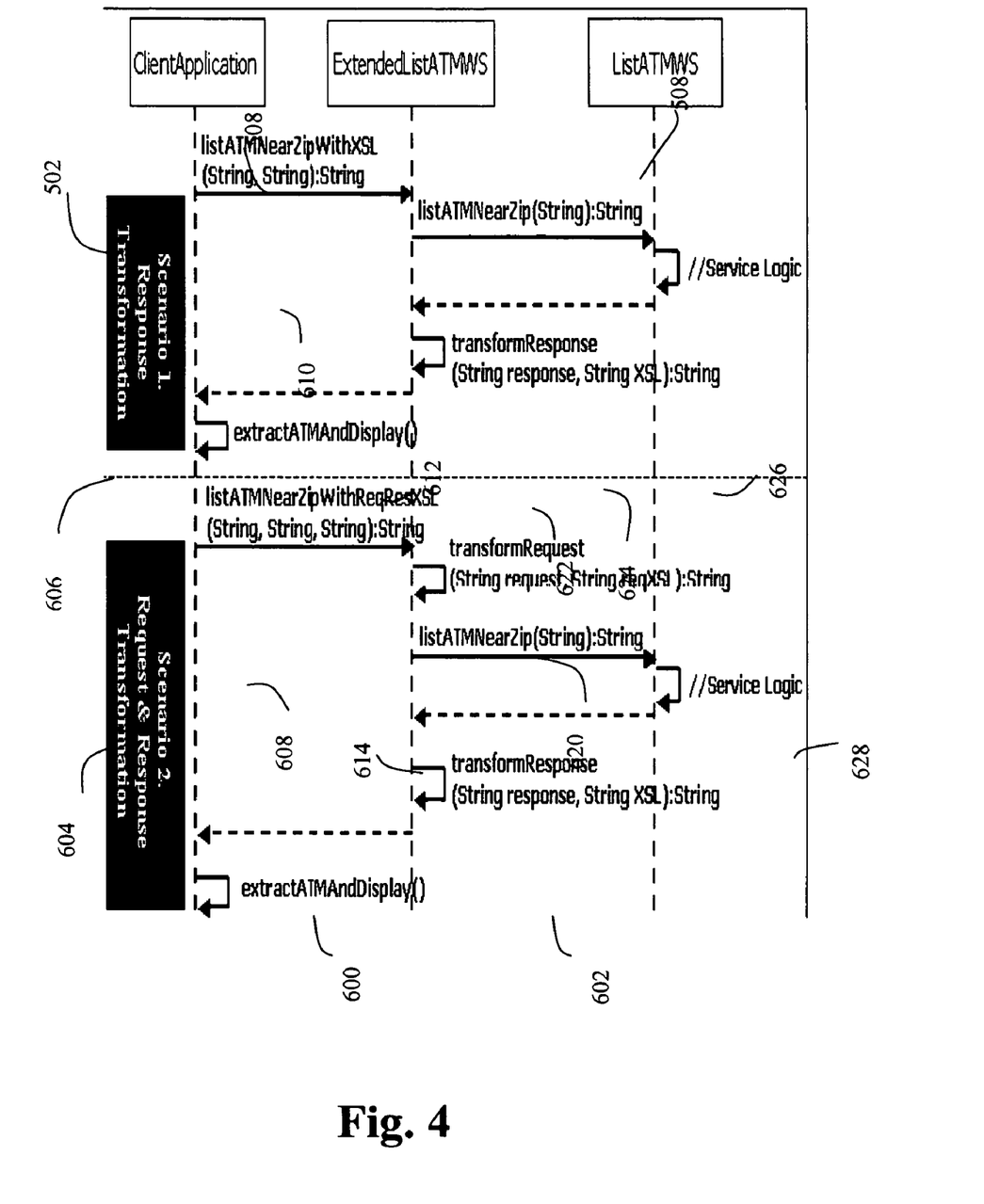
FIG. 4 shows a flow diagram of interactions between a client application and a web service in accordance with the methods described herein.

In contrast to method 500, the methods illustrated in FIG. 4 extend the service interface in a way that allows the applications 604 running on the pervasive device 10 to dynamically specify the schema (syntax) of the response XML. The extended interface 606 takes the response schema as an added input, over and above the input parameters required by the 'base' service interface of method 500. This extended interface 606 is also deployed as a web service, coupled with the original service 502 (also known as the base service). The extended interface 606 may run together with the web service 502 on server 20. Alternatively, the extended interface 606 and web service 502 may be distributed over multiple servers 20. For illustrative purposes, FIG. 4 uses the example of the ATM location service.

This arrangement allows applications 604 running on the pervasive device 10 to 'offload' part of their 'data parsing' overheads to the service provider by getting the response transformed to a schema that is not only easy to parse but also relevant to the application, thus saving on the airtime and response processing time at the pervasive device 10.

The extended interface can also assist to improve the performance further, by allowing the applications 604 to offload part of their 'data processing' task to the service. This allows the application 604 to pass certain post-processing instructions over the response XML to the service provider, which otherwise would be processed on the device 10 itself. The post-processing instructions allow further filtering of the response to make the response even more relevant to the application 604. The XSL, XPath and XQuery technologies (documented by the World Wide Web Consortium, W3.org) provide certain evaluation and computation functions that may be used in the transformation schema, thereby allowing applications 604 to use the technique to specify data processing instructions to the web service running on server 20.

This response transformation is illustrated in the first scenario 600 of FIG. 4. The client application 604 runs on pervasive device 10, and the web service 'ListATMWS' 502 runs on server 20, together with the extended interface 'ExtendedListATMWS' 606. In an initial step, the client application 604 sends a request for ATM information, together with the desired XSL schema. The format of the request is 'listTM-NearZipWithXSL(String, String):String' and the request is sent to the extended service interface 606. In turn, in step 610 the extended interface 606 sends a request 610 to the web service using the schema expected by the web service, here 'listATMNearZip(String): String'.

In step 508 the web service extracts the requested information (e.g. the result seen in Appendix A) and returns the result to the extended interface 606. In step 612 the extended interface 606 transforms the response according to the specified XSL schema 'transformResponse(string response, String XSL):String'. The output of step 612 is sent to the pervasive device 10, which performs step 614, 'extractATMAndDisplay( )', which extracts the ATM information and displays it for the user. Thus, although the final output to the user is the same, method 600 requires less memory usage and data processing in the pervasive device 10 than method 500.

The service interface 606 can further be extended to benefit the pervasive applications if the service request parameter schema is complex and resource-intensive to compose by the pervasive application due to the hierarchical nature of the XML data model.

The concept of data transformation can be applied to allow applications running on a pervasive device 10 to send XML parameters for a request in a format (schema) that is simple to construct and compose for the pervasive application but may not be compliant with the service request parameter schema. The extended service interface 606 allows applications on pervasive devices 10 to send an XSL associated with the request XML parameter that can translate the application-specified request XML to the XML compatible with the web service specification at the server 20. This allows applications to offload "data composition" overheads to formulate the complex request parameters required to interact with the web service.

The second scenario 602, in which the extended service interface 606 transforms both the request and the response is shown in FIG. 4. In a first step 620, a client application 604 running on pervasive device 10 sends a service request to the extended service interface 606 'ExtendedListATMWS'. The request has the format 'listATMNearZipWithReqREsXSL (String,String,String):String'.

In step 622 the extended service interface 606 transforms the request to match the schema required by the web service 502 'ListATMWS'. Step 622 may have the format 'transformRequest(String request, String reqXSL):String'. The transformed request is sent to the web service 502 and, in step 508, the web service 502 issues the required information, for example the response shown in Appendix A. Next, in step 626 ('transformResponse(String response, String XSL):String'), the extended service interface 606 transforms the response into the form required by the client application 604. The transformed response carries processed XML elements as attributes, thus making response parsing easy and fast for pervasive application 604. Finally, in step 628 the client application 604 extracts and displays the ATM information.

In the example, the XSL is specified to first select ATMs that accept AMX cards (using xsl:for each element of XSL), and then sort the list in ascending order of the transaction fee (using xsl:sort element of XSL) and then construct the response with the first three ATM elements from the sorted list (using xsl:if element and position method of XSL). The XSL thus allows offloading part of the application logic to the web service to improve service response time and resource utilization. This method also eliminates the earlier-described overhead where the service response-size is so huge that the pervasive application cannot receive or parse the response due to the limited memory of pervasive device 10. An XSL offered by the extended service interface 606 that can offload the described processing is shown in Appendix C.

The described methods allow the application 604 to efficiently exchange request and response XML data with the Web Service 502 in a format that is efficient for the application 604. The XSL can alternatively be also passed as request header to the web service.

Cost of Deploying Extended Web Service

Offloading data filtering and processing tasks from the application 604 to the web service 606, 502 requires additional computation and resources from the service provider. In a commercial setup where services are offered for a fee, an extended deployment to benefit the clients may demand an additional fee over the base service. In one arrangement, the extra cost for use of the extended service is borne by the end user. Although there is a more efficient usage of device resource, end users having devices with ample resources may not see enough benefit to pay an extra cost to use the extended service, until the point is reached when their device is low on available resources. This leads to a requirement to allow pervasive applications 604 to perform benefit analysis to dynamically choose between the base service 502 and extended service 606, 502 to optimize the resource utilization and amount spent to interact with the service.

Web Service QoS Attributes for Pervasive Devices

The following attributes are quantified to perform the benefit analysis regarding the use of the extended service. An application may use some or all of the attributes in performing the benefit analysis. Other attributes may also be used. The attributes are measured by the application 604 running on the pervasive device 10, or configured in the application 604.

Service Response Time. This is the total time spent between invoking the service and getting the response back on the device 10. It includes the time spent on the network and the web service. The service response time is an important measure for the device 10 as relates to device airtime, which is expensive in terms of power consumption and monetary cost.

Service Response Payload. This is the response size measured in bytes.

Response Processing Time. This is the time taken by the application 604 to extract and process relevant information from the response. The end-to-end application response time for the end user is the sum of service response time and response processing time.

Extended Service Cost Difference. This is the difference in the basic and extended service fee as offered by the service provider. The end user or the application provider configures this attribute.

Device Power Consumption. This attribute is computed using the service response time and response processing time to quantify the units of power consumed by the application 604 in the interaction with the web service. This attribute does not measure power consumption in absolute units, but quantifies the units in a suitable way for benefit analysis. The pervasive devices 10 have a pre-defined capacity for airtime and standby time. Airtime is the amount of time that the device 10 can be used for conversation and data exchange. Standby time is the length of time that the device 10 is completely ready to send or receive calls (or data), but is not being used in a call. Currently, pervasive devices 10 offer airtime to standby time ratios in the range of 0.02 to 0.05. For example, a device may have a standby time of 5 days while the airtime may be as low as 4 hours. The web service interaction time is equivalent to the device airtime, while the response processing time is equivalent to standby time in the context of power consumption. Since airtime is more significant and limited we may define one unit of power as the amount of power spent by the device 10 in one millisecond while interacting with the web service.

With this definition we can define an application's power consumption during interaction with a web service as:

P=(Service response time (in ms))+(Airtime to Standby time ratio)*(Response processing time (in ms)).

A value of 0.05 may be used for the airtime to standby ratio.

Extended Web Service Benefit Analysis using the QoS Attributes

The QoS attributes may be used as follows to compare the QoS that can be achieved using the base service or the extended service.

1. Service Response Payload Difference. If the response size of the base service 502 is above the capacity of the device 10 to process, the application 604 should switch to use the extended service 606 and provide a response schema that allows the extended service 606 to filter and reduce the response size so that the response can be successfully consumed by the application 604. The cost benefit analysis, as described below, is not required in such cases.

2. Relative Power Consumption. If the power consumed by the application 604 in using the extended service 606 (computed by using the method defined above) is less than the power consumed using the base service 502 and the difference is significantly large, the application 604 should switch to use the extended service 606 if the device 10 is un-charged and is left with little power. A threshold may be configured for this purpose. The cost benefit analysis, as described below, is ignored in such cases. However, if the device 10 has adequate power then the cost benefit analysis is done to compare the advantage of using the extended service 606.

3. Cost Benefit Analysis. The cost benefit analysis is used when the device 10 has adequate power and the response size of the base service 502 is not over the configured threshold. This will be the most frequent situation compared with the above two. An application 604 should switch to use the extended service 606 if there is sufficient benefit in power consumption and response time so as to justify the extra monetary cost involved in using the extended service 606.

The following scheme may be used in the pervasive application 604 to decide when to switch to use the extended service. The application 604 should switch to use the extended service 606 if any of the following conditions is met:

1. (Cost difference between the extended and base service) <(a pre-configured amount) i.e. extended service cost overhead is not expensive.

2. (Percentage cost difference between the extended and base service ($\Delta C/C_{Base\ Service}*100$))<(a preconfigured percentage) i.e. extended service cost overhead is relatively not so expensive.

3. (Difference in the response time between the extended and base service)>(a pre-configured time in seconds).

4. (Percentage power saved using the extended service ($\Delta P/P_{Base\ Service}*100$))>(a pre-configured percentage).

The application provider or the end user can configure the above described threshold parameters.

Development of the Web Service

The development of the extended service 606 may be implemented, for example, as a plugin for IBM™ WebSphere Studio Application Developer (WSAD) IDE (IBM, DB2 and WebSphere are trademarks of International Business Machines Corporation). The plugin adds a new command to extend the web service 502 and generates the code required for XML transformation for the extended service 606 using the XSLT libraries. The command may offer to create two extended services. The first extended service allows application 604 to pass the response XSL for response transformation while the second extended service allows the application 604 to pass both request and response XSL for transforming the request and response respectively.

Case Study

This section describes a Web Service and a pervasive application developed to examine the advantages of using extended services in the context of pervasive devices. A benefit analysis is performed to find situations that are specific to the device and the service where the end user may not gain significant advantage in using the extended service compared to the cost overhead involved with the extended service.

ListATMNearZip Web Service

A simple Web Service in was developed in Java™ that provides the user with address and other details of the ATMs near the given zip and country code. The service interface accepts a single argument modeled as XML document containing the user specified zip code and country code. The service provides its response as XML document similar to the one shown in Appendix A. A database is created using IBM DB2™ containing a few thousand records of ATM locations in different zip and country codes. For a given request, the service executes the query against the database to get the list of ATMs and then package the result in a XML document. We also deploy the extension of this service that allows client applications to specify the XSL to offload data processing and filtering tasks. Both the services are deployed using Document/Literal deployment style.

Pervasive Application

In the case study, we assume a simple business scenario where the service provider gets a pervasive application developed by an external software organization. The application is offered by the service provider for its cardholders. The application allows the cardholders to get the list of three ATMs accepting AMX cards near the given zip and country code over their pervasive handheld devices. The response also indicates whether there is any transaction fee involved in using the AMX card with the available ATMs. The application lists only three ATMs in the ascending order of the transaction fee. The data relevant to the application is shown in Appendix B. XSL developed to transform the response of the base service to the desired format is shown in Appendix C.

Experiments

The first set of experiments is done without using the extended service. The second set of experiments is done using the extended service. In both the experiments we run the application from three different devices having increasing order of capacity. The application interacts with the service with three different request parameters (zip and country code) and the response produced by the service for each of the request varies in the increasing order of size, besides the content. Following are the details for the same.

Device types:

1. Processing speed: 300 bytecodes/ms, Network bandwidth: 9.6 Kbps.

2. Processing speed: 600 bytecodes/ms, Network bandwidth: 28.8 Kbps.

3. Processing speed: 1000 bytescodes/ms, Network bandwidth: 56 Kbps.

Figure 5:
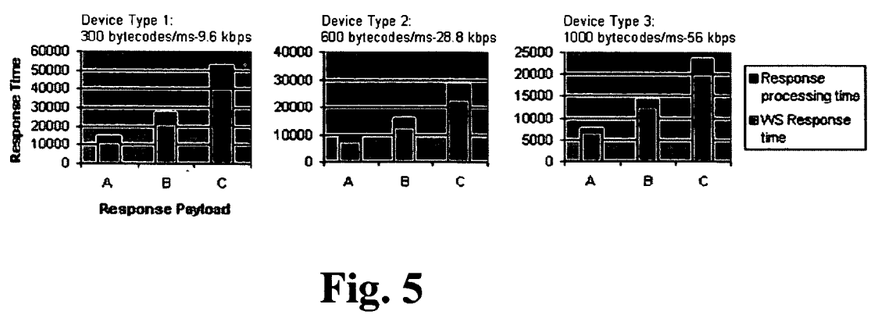
FIG. 5 shows the results of tests of application performance without the extended service.
Figure 6:
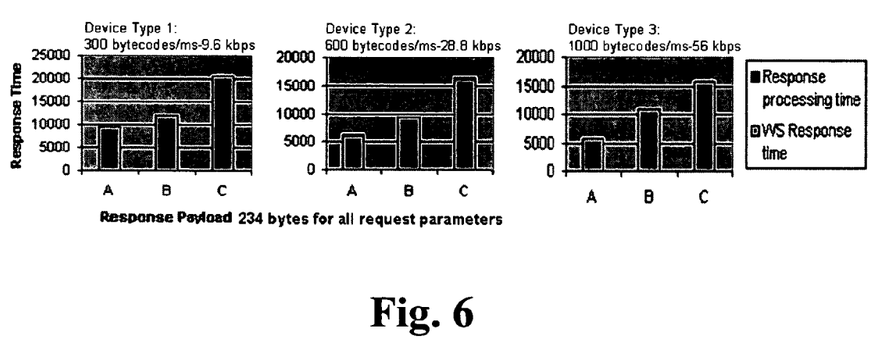
FIG. 6 shows the results of tests of application performance with the extended web service.

Response size, as produced by the base service:
Request parameter A: 4748 bytes
Request parameter B: 9882 bytes
Request parameter C: 20012 bytes
Response size, as produced by the extended service:
Request parameter A, B & C: 234 bytes To simulate a 'close to real world' scenario, we deploy the service on WebSphere™ running on a server with 2 GB memory in the United States. The DB2™ database is also deployed on the same machine. The WTK (i.e. the Java™ Wireless ToolKit) and the pervasive application are deployed on a server in India. A company network (WAN) is used for interaction between the application and the web service. We measure service response time and response processing time in milliseconds and response size in bytes in the application. FIGS. 5 and 6 show the experiment results for the pervasive application without and with extended service respectively.

Benefit Relative to the Cost Overhead

Figure 7:
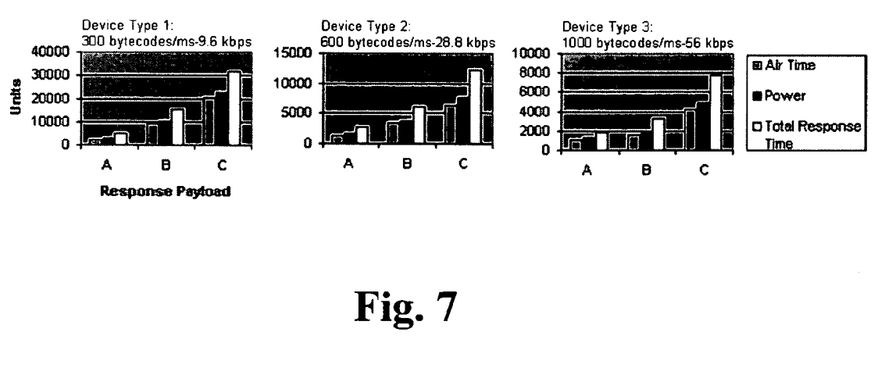
FIG. 7 illustrates the benefit analysis of the extended service.

As shown in FIG. 7, there is a power, airtime and response time benefit to use the extended deployment in all the interactions and device types. If the device is low on power or the service response size is over the threshold size or the cost overhead involved to use the extended service is below the configured limits, there is a clear advantage to use the extended deployment. However, if the cost overhead is above the configured limits and the device has adequate power and resources, the application may not use the extended service to save on the cost and yet not compromising the overall QoS. To discuss the same, we re-visit the cost benefit rules as defined above.

As the first two conditions evaluate to false, next we compute the response time benefit and percentage of power saved in using the extended service. Table A shows the percentage power and response time benefit using the extended service. The following results show each of two components for individual device and service response. If the pervasive application is configured to use the extended service if response time benefit is over 5 seconds or the percentage of power saved is saved is over 25%, then Table B shows cases where application may choose not to use the extended deployment to optimize the overall QoS.

TABLE A

Percentage power and response time benefit using the Extended Service

| Response Payload | A | B | C |
|---|---|---|---|
| Device 1 | 23.30% | 47.12% | 52.38% |
| Device 2 | 20.61% | 29.25% | 31.85% |
| Device 3 | 18.13% | 15.01% | 23.73% |
| Device 1 | 5 seconds | 15 seconds | 32 seconds |
| Device 2 | 3 seconds | 6 seconds | 12 seconds |
| Device 3 | 2 seconds | 3 seconds | 8 seconds |

TABLE B

Cases where Extended Deployment may not improve service QoS for pervasive device

| Response Payload | A | B | C |
|---|---|---|---|
| Device 1 | X | | |
| Device 2 | X | | |
| Device 3 | X | X | |

QoS Aware Pervasive Application Development

The unique characteristics of each service and device coupled with the realtime resource 'situations' of the device may require pervasive applications to be sensitive to the way they utilize the resources so that overall QoS can be improved. The previous sections described how the service and the application could collaborate to optimize the overall QoS. In this section we discuss a few techniques that may assist the application achieve such collaboration.

The end user of pervasive applications may not understand the finer aspects involved in optimizing the user's costs and resources. However, the application provider may develop applications in such a way that can be dynamically configured for QoS rules, as defined above, by techniques like mobile messaging. The application should also provide a simple and single configuration option to the end user to specify his or her preference to either just save on costs by choosing to use the base service only or optimizing the overall resource consumption by analyzing the benefits and deciding what service to use under what resource situations. If the 'optimized' mode is selected, the application running on the pervasive device 10 should carry logic to use both the extended and base service and collect statistics that may enable the application to perform benefit analysis. Application developers may develop smart logic that is specific to their context and tune the benefit analysis cycle and conditions. For example, if an application has already determined that there are no benefits to use the extended service for a given response size and time, it may not perform any further benefit analysis for all subsequent interactions with that service until the response size of the subsequent invocation is larger than the response size used in previous analysis cycles. Thus each analysis cycle may re-define the boundary limits for next analysis cycle. Such statistics can be persisted at the device. Similarly other context specific knowledge can be applied to make applications use the extended service without the need to perform benefit analysis. For example, an application that already determined benefits in using the extended ATM service discussed above for zip code '123' and country code 'IND' due to a large benefit in reduced response size (and thus power), may choose to use the extended service for a later interaction with zip code '122' and country code 'IND'. Here, context specific knowledge 'foretells' the application about the possible benefits.

As seen in the case study above, the proposed extended deployment scheme may benefit the overall service QoS for the pervasive device 10. This may motivate service providers to always couple their services with the extended service to benefit their clients. The service provider may choose to charge an extra fee for allowing applications to 'offload' their data parsing and compute tasks to the service; however, the choice to use the extended deployment still lies with the application on the pervasive device. The application, depending on the available resources on the device and cost overhead involved, may dynamically choose between the extended and the base service, thus giving the total control to the end user to define the way his or her resources should be utilized.

The proposed methods allow pervasive applications to be sensitive to the resource and cost utilization involved in using a web service. The QoS model as defined above can be used with or without modifications to evaluate benefits in using the base and extended service to overall improve the QoS for the pervasive device and the end user.

CONCLUSION

Various alterations and modifications can be made to the techniques and arrangements described herein, as would be apparent to one skilled in the relevant art.

APPENDIX A

Example of Web Service Response

```
<ATM>
    <BANK>HDBank</BANK>
    <CARDS>
        <CARD>
            <TYPE>AMX</TYPE>
            <TX_FEE_PER>0.04</TX_FEE_PER>
            <CASH_LIMIT>20000</CASH_LIMIT>
        </CARD>
        <CARD>
```

APPENDIX A-continued

Example of Web Service Response

```
            <TYPE>VISAA</TYPE>
            <TX_FEE_PER>0</TX_FEE_PER>
            <CASH_LIMIT>10000</CASH_LIMIT>
        </CARD>
    </CARDS>
    <ADDRESS>
        <STREET>2nd Street</STREET>
        <BLDG_NO>999</BLDG_NO>
        <CITY>DEL</CITY>
        <ZIP>134</ZIP>
        <COUNTRY>IND</COUNTRY>
    </ADDRESS>
</ATM>
<ATM>
    <BANK>ICBank</BANK>
    <CARDS>
        <CARD>
            <TYPE>MASTCARD</TYPE>
            <TX_FEE_PER>0</TX_FEE_PER>
            <CASH_LIMIT>5000</CASH_LIMIT>
        </CARD>
        <CARD>
            <TYPE>DNERCARD</TYPE>
            <TX_FEE_PER>0.03</TX_FEE_PER>
            <CASH_LIMIT>15000<CASH_LIMIT>
        </CARD>
    </CARDS>
    <ADDRESS>
        <STREET>2nd Street</STREET>
        <BLDG_NO>899</BLDG_NO>
        <CITY>DEL</CITY>
        <ZIP>134</ZIP>
        <COUNTRY>IND</COUNTRY>
    </ADDRESS>
</ATM>
```

APPENDIX B

Subset of response relvant to application running on pervasive device

```
<ATM>
    <TX_FEE_PER>0.04</TX_FEE_PER>
    <STREET>2nd Street</STREET>
    <BLDG_NO>999</BLDG_NO>
</ATM>
<ATM>
    <TX_FEE_PER>0.05</TX_FEE_PER>
    <STREET>2nd Street</STREET>
    <BLDG_NO>997</BLDG_NO>
</ATM>
<ATM>
    <TX_FEE_PER>0.07</TX_FEE_PER>
    <STREET>3rd Street</STREET>
    <BLDG_NO>111</BLDG_NO>
</ATM>
```

Appendix C: Example of XSL to Filter and Process the Response from the Web Service

```
<?xml version="1.0" encoding="UTF-8"?>
<xsl:stylesheet xmlns:xsl="http://www.w3.org/1999/XSL/Transform" version="1.0"
    xmlns:xalan="http://xml.apache.org/xslt">
    <xsl:output method="xml" encoding="UTF-8" indent="no"/>
    <xsl:template match="/">
        <xsl:element name="ATM_ADDRESS">
            <xsl:for-each select="//ATM[//TYPE[text( )='AMX']]">
                <xsl:sort data-type="number" select="CARDS/CARD/TX_FEE_PER"/>
                <xsl:if test="position( )<4">
                    <xsl:element name="ATM">
                        <xsl:attribute name="TX_FEE_PER">
```

```
            <xsl:value-of select="CARDS/CARD/TX_FEE_PER"/>
        </xsl:attribute>
        <xsl:attribute name="BLDG_NO">
            <xsl:value-of select="ADDRESS/BLDG_NO"/>
        </xsl:attribute>
        <xsl:attribute name="STREET">
            <xsl:value-of select="ADDRESS/STREET"/>
        </xsl:attribute>
                    </xsl:element>
                </xsl:if>
            </xsl:for-each>
        </xsl:element>
    </xsl:template>
</xsl:stylesheet>
```

The invention claimed is:

1. A method of selecting web services accessible over a communications network from a pervasive device, said web services including at least one base web service and corresponding extended web service, said method comprising the steps of:

evaluating attributes of a Quality of Service (QoS) model, said attributes relating to the use of the base web service and extended web service by said pervasive device, wherein the attributes include at least a service response processing time of the pervasive device and device power consumption of the pervasive device for processing a response;

assessing said attributes according to predetermined selection criteria; and selecting one of the base web service and extended web service based on said assessed attributes.

2. A method according to claim 1 wherein use of said extended web service reduces a computational load of said pervasive device in an interaction with said base web service.

3. A method according to claim 1 wherein one of said attributes is a service response time indicative of time spent between said pervasive device invoking a web service and said pervasive device receiving a response from said web service.

4. A method according to claim 3 wherein said power consumption value is dependent on said service response time and said service response processing time.

5. A method according to claim 3 wherein said extended web service is selected if said size of said response exceeds a processing capacity of said pervasive device.

6. A method according to claim 3 wherein said pervasive device has a chargeable power source and extended web service is selected if a charge of the power source is below a threshold and the power consumption value relating to the extended web service is lower than the power consumption value relating to the base web service.

7. A method according to claim 1 wherein one or more parameters of said selection criteria are configurable by a user of said pervasive device.

8. A method according to claim 1 wherein said extended web service transforms a response from said base web service in accordance with a requirement of a software application deployed on said pervasive device.

9. A method according to claim 1 wherein said extended web service transforms a request from an application deployed on said pervasive device in accordance with an input requirement of said base web service.

10. A method according to claim 1 wherein one of said attributes is a service response payload indicative of a size of said response.

11. A method according to claim 1 wherein one of said attributes is a cost difference indicative of a cost of using said extended web service relative to a cost of using said base web service.

12. A method according to claim 8 wherein said extended web service transforms a request from an application deployed on said pervasive device in accordance with an input requirement of said base web service.

13. An apparatus for selecting web services accessible over a communications network from a pervasive device, said web services including at least one base web service and corresponding extended web service, said apparatus comprising:

means for evaluating attributes of a Quality of Service (QoS) model, said attributes relating to the use of the base web service and extended web service by said pervasive device, wherein the attributes include at least a service response processing time of the pervasive device and device power consumption of the pervasive device for processing a response;

means for assessing said attributes according to predetermined selection criteria; and means for selecting one of the base web service and extended web service based on said assessed attributes.

14. A system for selecting web services accessible over a network, said system comprising:

a pervasive device in communication with said network;

one or more servers in communication with said network and supporting at least one base web service that provides an output in reply to a request from said pervasive device; and one or more servers in communication with said network and supporting at least one extended web service operable to reduce a computational load of said pervasive device in an interaction with said base web service, wherein an application running on said pervasive device evaluates attributes of a Quality of Service (QoS) model relating to interactions between said pervasive device, a said base web service and corresponding expanded web service, and wherein said application chooses whether or not to use said corresponding web service based on said evaluated attributes, wherein the attributes include at least a service response processing time of the pervasive device and device power consumption of the pervasive device for processing a response.

15. A computer program product comprising machine-readable program code recorded on a machine-readable recording medium, for controlling the operation of a data processing apparatus on which the program code executes to perform a method of selecting web services accessible over a communications network from a pervasive device, said web services including at least one base web service and corresponding extended web service, said computer program product comprising:

code for evaluating attributes of a Quality of Service (QoS) model, said attributes relating to the use of the base web service and extended web service by said pervasive device, wherein the attributes include at least a service response processing time of the pervasive device and device power consumption of the pervasive device for processing a response;

code for assessing said attributes according to predetermined selection criteria; and     code for selecting one of the base web service and extended web service based on said assessed attributes.

* * * * *

UNITED STATES PATENT AND TRADEMARK OFFICE
CERTIFICATE OF CORRECTION

PATENT NO.        : 7,640,331 B2                                   Page 1 of 1
APPLICATION NO.  : 11/321179
DATED             : December 29, 2009
INVENTOR(S)       : Batra et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 671 days.

Signed and Sealed this

Ninth Day of November, 2010

David J. Kappos
*Director of the United States Patent and Trademark Office*